(12) United States Patent
Jo

(10) Patent No.: US 11,603,912 B2
(45) Date of Patent: Mar. 14, 2023

(54) ELECTRONIC PARKING BRAKE DEVICE

(71) Applicant: HYUNDAI MOBIS CO., LTD., Seoul (KR)

(72) Inventor: Chi Hoon Jo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 328 days.

(21) Appl. No.: 16/918,862

(22) Filed: Jul. 1, 2020

(65) Prior Publication Data
US 2021/0253074 A1 Aug. 19, 2021

(30) Foreign Application Priority Data
Feb. 13, 2020 (KR) .................. 10-2020-0017301

(51) Int. Cl.
| | | |
|---|---|---|
| B60T 13/74 | (2006.01) | |
| F16H 25/20 | (2006.01) | |
| F16D 51/24 | (2006.01) | |
| F16D 65/22 | (2006.01) | |
| F16D 121/04 | (2012.01) | |
| F16D 121/24 | (2012.01) | |
| F16D 125/40 | (2012.01) | |
| F16D 123/00 | (2012.01) | |

(52) U.S. Cl.
CPC ............ F16H 25/20 (2013.01); F16D 51/24 (2013.01); F16D 65/22 (2013.01); *F16D 2121/04* (2013.01); *F16D 2121/24* (2013.01); *F16D 2123/00* (2013.01); *F16D 2125/40* (2013.01); *F16H 2025/2046* (2013.01); *F16H 2025/2084* (2013.01)

(58) Field of Classification Search
CPC ...... B60T 1/067; B60T 13/741; B60T 13/746; F16D 51/24; F16D 65/22; F16D 2121/24; F16D 2125/40; F16D 2125/42; F16D 2121/04; F16D 2123/00; F16H 25/20
See application file for complete search history.

(56) References Cited

U.S. PATENT DOCUMENTS

| | | | |
|---|---|---|---|
| 6,244,394 B1 | 6/2001 | Gutierrez et al. | |
| 2018/0058525 A1* | 3/2018 | Kasper | ............... F16D 51/28 |
| 2020/0055505 A1* | 2/2020 | Choi | ............... B60T 13/741 |

FOREIGN PATENT DOCUMENTS

| | | | |
|---|---|---|---|
| DE | 102005025297 A1 * | 12/2006 | ............ F16D 51/20 |
| DE | 102017008196 A1 * | 2/2019 | |

(Continued)

OTHER PUBLICATIONS

Machine translation of DE 102005025297 (no date).*

(Continued)

*Primary Examiner* — Nicholas J Lane
(74) *Attorney, Agent, or Firm* — NovoTechIP International PLLC

(57) ABSTRACT

An electronic parking brake device may include: a plate part having a brake shoe rotatably mounted thereon; a housing part mounted on the plate part and configured to guide hydraulic pressure; a motor part mounted on the housing part, and driven when power is applied thereto; a piston part mounted on the housing part, and moved by hydraulic pressure so as to operate the brake shoe; and an operating part embedded in the housing part, and driven by the motor part so as to move the piston part.

9 Claims, 8 Drawing Sheets

(56) References Cited

FOREIGN PATENT DOCUMENTS

| JP | 2017-072168 A | 4/2017 |
| JP | 2017072168 A | 4/2017 |
| KR | 10-2013-0123787 A | 11/2013 |
| WO | 2015/199237 A1 | 12/2015 |
| WO | 2015199237 A1 | 4/2017 |

OTHER PUBLICATIONS

Machine translation of DE 102017008196 (no date).*
Office Action of Korean Patent Application No. 10-2020-0017301—7 pages (dated Dec. 15, 2020).
Office Action dated May 24, 2021 in corresponding Korean Patent Application No. 10-2020-0017301 (no English Language Translation).

* cited by examiner

ELECTRONIC PARKING BRAKE DEVICE

CROSS-REFERENCE TO RELATED APPLICATION

This application claims priority from and the benefit of Korean Patent Application No. 10-2020-0017301, filed on Feb. 13, 2020, which is hereby incorporated by reference for all purposes as if set forth herein.

BACKGROUND

Field

Exemplary embodiments of the present disclosure relate to an electronic parking brake device, and more particularly, to an electronic parking brake device which can implement electronic parking braking and traveling braking by hydraulic pressure in a small vehicle with a small wheel layout.

Discussion of the Background

In general, an electronic drum brake is designed to have a structure in which a parking part and a hydraulic piston serving as a main brake part are separated from each other. When hydraulic pressure is applied to the hydraulic piston during main parking, a shoe assembly pressurizes a drum to reduce the speed of the vehicle. When the vehicle is parked, an actuator is operated to rotate a worm gear and a bolt screw, with the hydraulic piston pressurized. Then, a parking piston pressurizes the shoe assembly to additionally generate a parking force.

In the related art, however, since the parking part and the hydraulic piston serving as the main brake part are separated from each other in a 2-row structure, it is difficult to reduce the size of the electronic drum brake. Thus, it is difficult to use the electronic drum brake as a drum parking brake of a small vehicle. Therefore, there is a need for a device capable of solving the problem.

The related art of the present disclosure is disclosed in Korean Patent Application No. 2013-0123787 published on Nov. 13, 2013 and entitled "Electronic Parking Brake Device".

SUMMARY

Various embodiments are directed to an electronic parking brake device which can implement electronic parking braking and traveling braking by hydraulic pressure in a small vehicle with a small wheel layout.

In an embodiment, an electronic parking brake device may include: a plate part having a brake shoe rotatably mounted thereon; a housing part mounted on the plate part and configured to guide hydraulic pressure; a motor part mounted on the housing part, and driven when power is applied thereto; a piston part mounted on the housing part, and moved by hydraulic pressure so as to operate the brake shoe; and an operating part embedded in the housing part, and driven by the motor part so as to move the piston part.

The housing part may include: a body having the motor part mounted therein; a body operation hole formed in the body, and configured to form a side-to-side moving space of the operating part; and a body hydraulic hole formed in the body so as to guide hydraulic pressure, and configured to communicate with the body operation hole.

The motor part may include: a motor case mounted on the housing part; a motor driver embedded in the motor case, and driven when power is applied thereto; and a motor shaft rotated by the motor driver, and configured to rotate the operating part.

The piston part may include: a first piston part inserted into one side of the housing part, and protruded from the housing part by hydraulic pressure and the operating part so as to push the brake shoe; a first sealing part embedded in the housing, and pressed against the first piston part; a second piston part inserted into the other side of the housing part, and protruded from the housing part by hydraulic pressure and the operating part so as to push the brake shoe; and a second sealing part embedded in the housing, and pressed against the second piston part.

The operating part may include: an operating gear part embedded in the housing part, and rotated by the motor part; an operating wheel part embedded in the housing part, and engaged and rotated with the operating gear part; and an operating rod part movable through the operating wheel part, and configured to push the piston part by being rotated as the operating wheel is rotated.

The operating wheel part may include: a wheel pipe part through which the operating rod part is passed; and a wheel gear part formed on the outer circumferential surface of the wheel pipe part, and engaged and rotated with the operating gear part.

The operating gear part and the wheel gear part may transfer power through a worm gear method.

The operating rod part may include: a rod center part movable in the axial direction through the wheel pipe part, and rotatable while interlocking with the wheel pipe part; a rod rotating part extended from one side of the rod center part, and connected to any one of the first piston part and the second piston part; and a rod pressing part extended from the other side of the rod center part, and configured to push the other one of the first piston part and the second piston part.

The rod center part may be formed in an angled shape and brought into surface contact with the inside of the wheel pipe part.

The rod center part and the wheel pipe part may be spline-coupled.

The rod rotating part may be screwed to any one of the first piston part and the second piston part.

The rod pressing part may be inserted into the other one of the first piston part and the second piston part.

The electronic parking brake device in accordance with the embodiment of the present disclosure may perform main braking using hydraulic pressure. Furthermore, while rotated by the operation of the motor part, the operating part may push the piston part disposed on both sides of the operating part, thereby providing a parking braking force. At this time, since the operating part and the piston part are arranged in a line, the size of a product can be reduced, which makes it possible to apply the product to a small vehicle.

DETAILED DESCRIPTION OF THE ILLUSTRATED EMBODIMENTS

Hereinafter, an electronic parking brake device will be described below with reference to the accompanying drawings through various exemplary embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
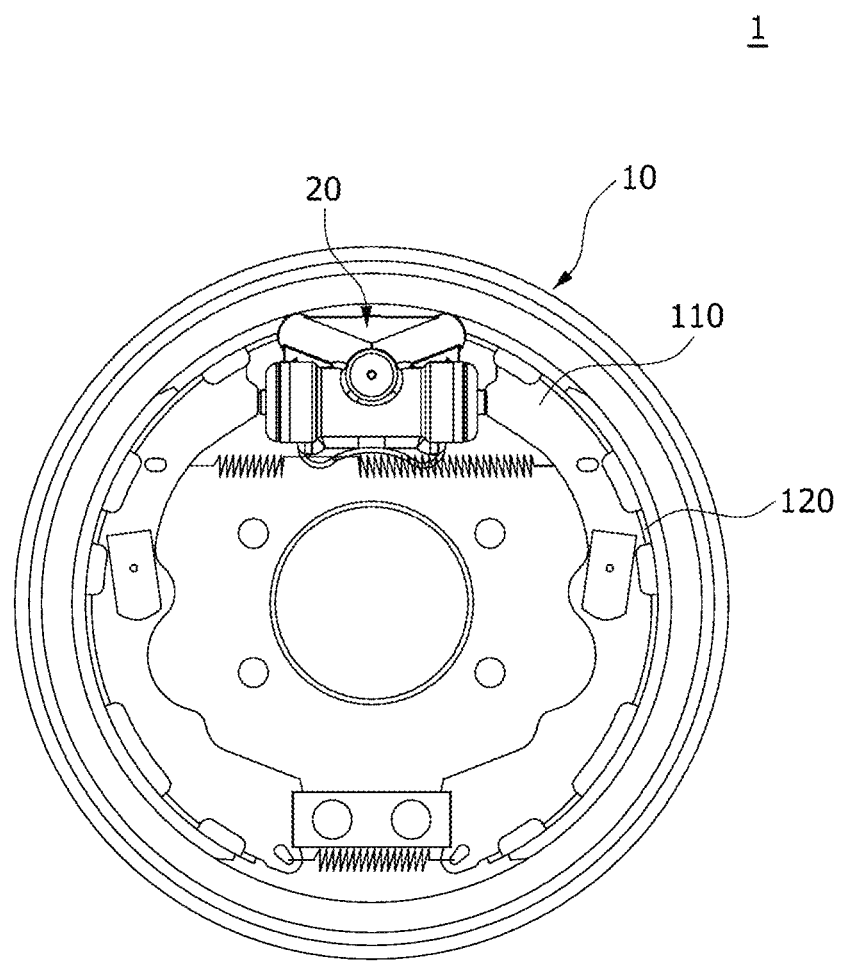
FIG. 1 is a diagram schematically illustrating an electronic parking brake device in accordance with an embodiment of the present disclosure.
Figure 2:
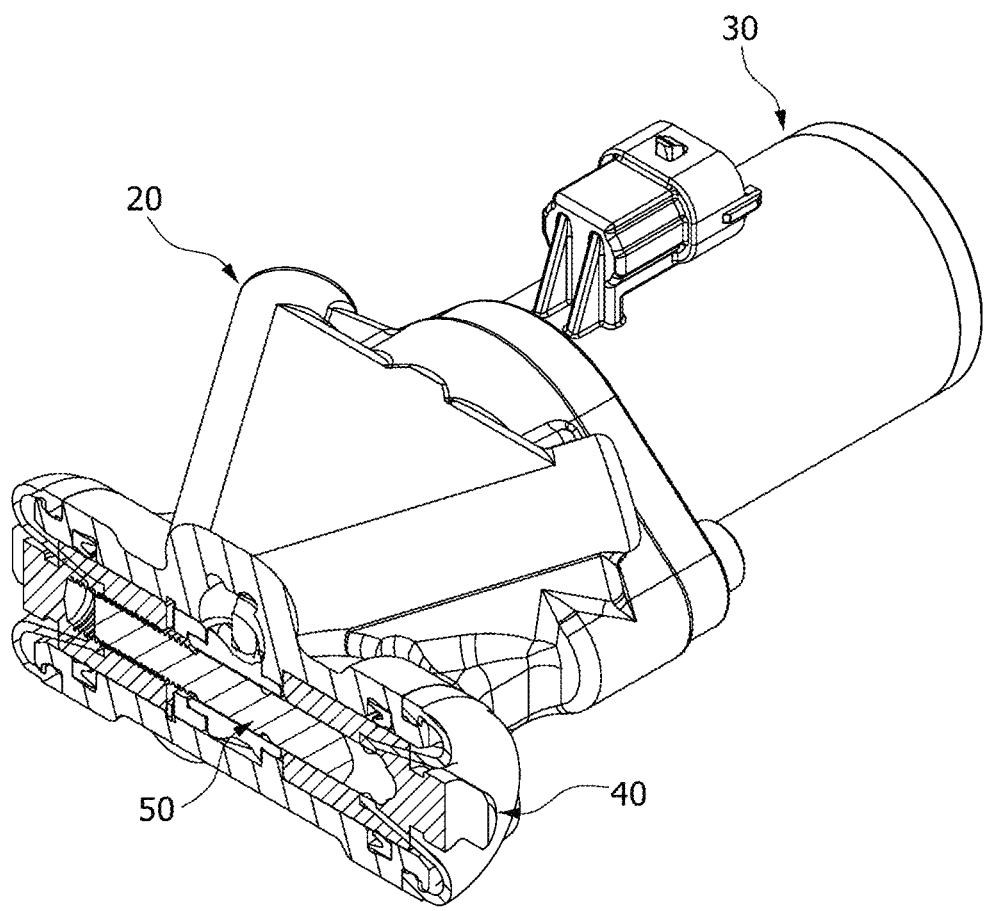
FIG. 2 is a cross-sectional view schematically illustrating the electronic parking brake device in accordance with the embodiment of the present disclosure.

FIG. 1 is a diagram schematically illustrating an electronic parking brake device in accordance with an embodiment of the present disclosure, and FIG. 2 is a cross-sectional view schematically illustrating the electronic parking brake device in accordance with the embodiment of the present disclosure. Referring to FIGS. 1 and 2, the electronic parking brake device 1 in accordance with the embodiment of the present disclosure includes a plate part 10, a housing part 20, a motor part 30, a piston part 40 and an operating part 50.

The plate part 10 is mounted on a vehicle body, and has a pair of brake shoes 110 rotatably mounted thereon. For example, the brake shoes 110 may be disposed symmetrically with each other, and the bottoms thereof may be rotatably mounted on the plate part 10. Such a brake shoe 110 may have a lining 120 attached to the outside thereof, the lining 120 being brought into contact with a drum.

The housing part 20 is mounted on the plate part 10, and guides hydraulic pressure. For example, the housing part 20 may be bolt-coupled to the plate part 10, and connected to a flow path of a hydraulic brake device such that hydraulic pressure for main braking is supplied.

The motor part 30 is mounted on the housing part 20, and driven when power is applied thereto. For example, the motor part 30 may be bolt-coupled to the housing part 20. A part of the motor part 30 may be embedded in the housing part 20, and provide a rotational force.

The piston part 40 is mounted on the housing part 20, and moved by hydraulic pressure so as to operate the brake shoe 110. For example, the piston part 40 may be disposed on each of the left and right sides of the housing part 20, and generate a braking force by pushing the upper portion of the corresponding brake shoe 110.

The operating part 50 is embedded in the housing part 20, and driven by the motor part 30 so as to move the piston part 40. That is, the piston part 40 may be operated by hydraulic pressure supplied to the housing part 20, or operated by the operation of the motor part 30 so as to generate a braking force.

Figure 3:
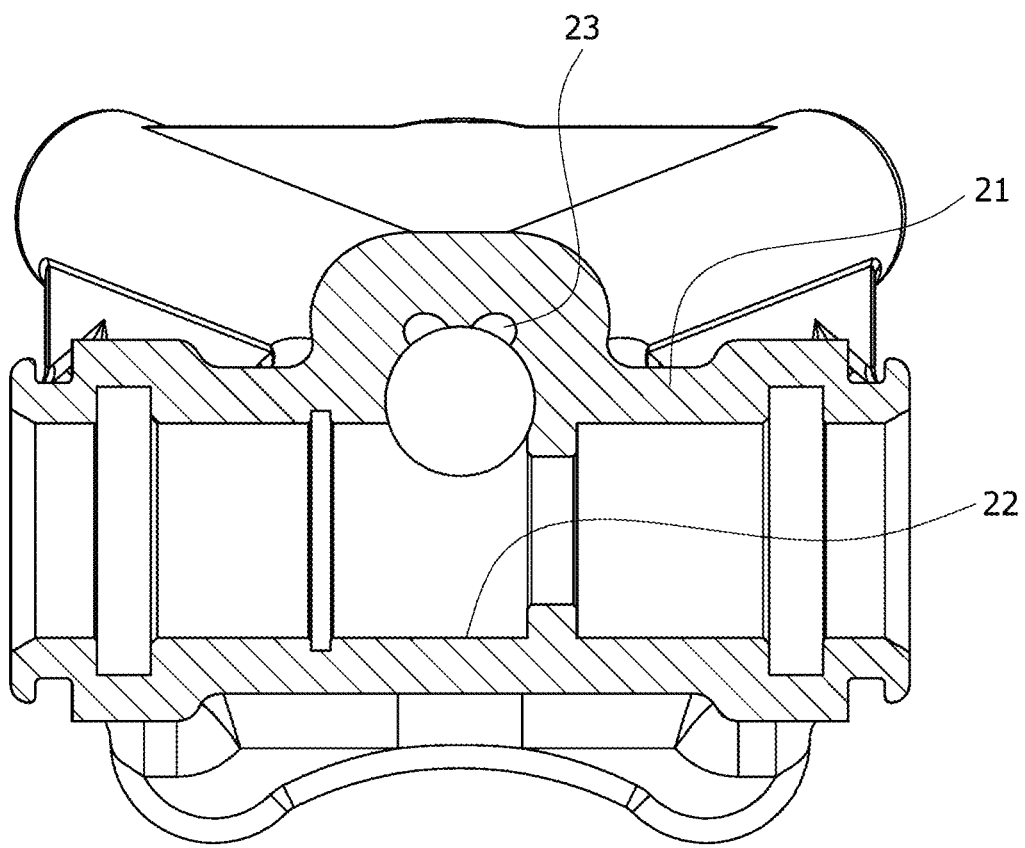
FIG. 3 is a diagram schematically illustrating a housing part in accordance with the embodiment of the present disclosure.

FIG. 3 is a diagram schematically illustrating the housing part in accordance with the embodiment of the present disclosure. Referring to FIG. 3, the housing part 20 in accordance with the embodiment of the present disclosure includes a body 21, a body operation hole 22 and a body hydraulic hole 23.

The motor part 30 is mounted in the body 21. For example, the motor part 30 is bolt-coupled to the rear surface of the body 21, and the circumference of the body 21 may be mounted on the plate part 10 so as to maintain a fixed state.

The body operation hole 22 is formed in the body 21, and forms a side-to-side moving space of the operating part 50. For example, the body operation hole 22 may be formed in the side-to-side direction of the body 21 so as to open both sides of the body 21, and form the side-to-side moving space for the operating part 50 and the piston part 40 disposed on either side of the operating part 50.

The body hydraulic hole 23 is formed in the body 21 so as to guide hydraulic pressure, and communicates with the body operation hole 22. For example, a pair of body hydraulic holes 23 may be obliquely disposed, and communicate with the top of the body operation hole 22 so as to supply hydraulic pressure to the body operation hole 22.

Figure 4:
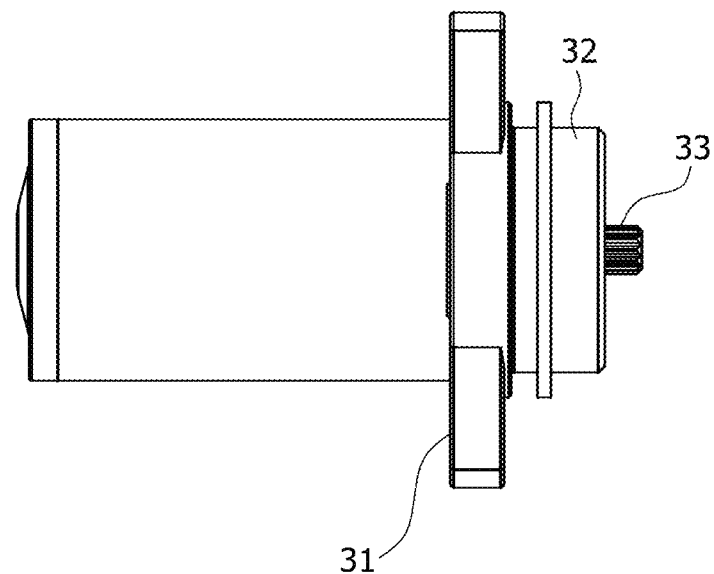
FIG. 4 is a diagram schematically illustrating a motor part in accordance with the embodiment of the present disclosure.

FIG. 4 is a diagram schematically illustrating the motor part in accordance with the embodiment of the present disclosure. Referring to FIG. 4, the motor part 30 in accordance with the embodiment of the present disclosure includes a motor case 31, a motor driver 32 and a motor shaft 33.

The motor case 31 is mounted in the housing part 20. For example, the motor case 31 may have a flange formed on the outside thereof so as to be bolt-coupled to the body 21.

The motor driver 32 is embedded in the motor case 31, and driven when power is applied. The motor shaft 33 is rotated by the motor driver 32, and rotates the operating part 50. For example, the motor shaft 33 may be inserted into the body operation hole 22.

Figure 5:
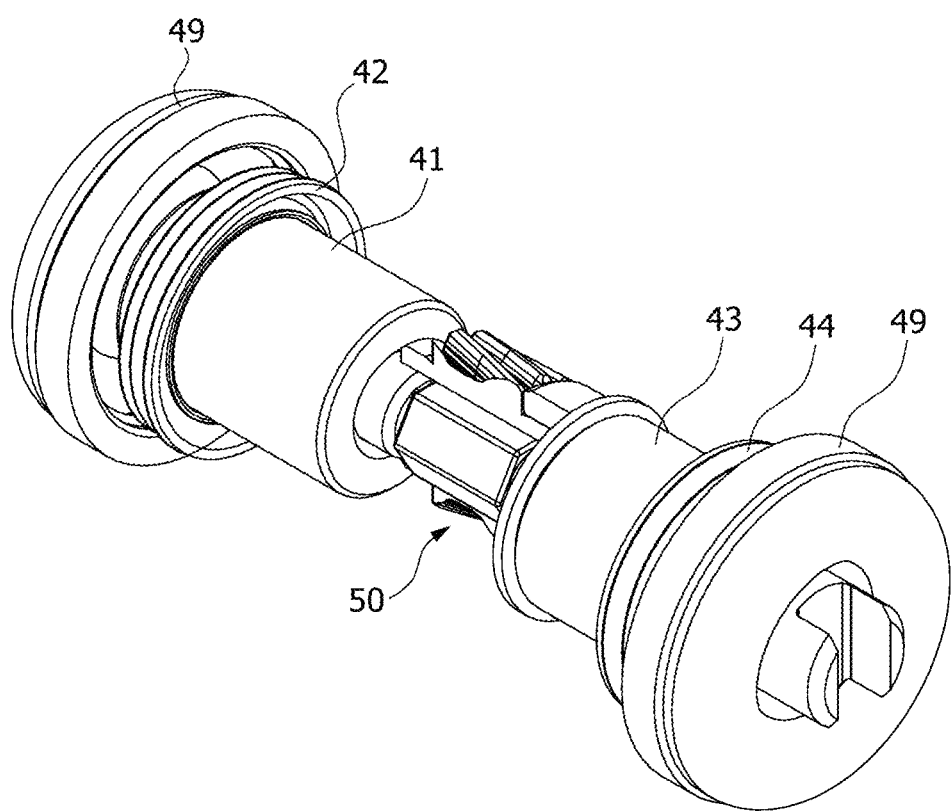
FIG. 5 is a diagram schematically illustrating a piston part in accordance with the embodiment of the present disclosure.

FIG. 5 is a diagram schematically illustrating the piston part in accordance with the embodiment of the present disclosure. Referring to FIG. 5, the piston part 40 in accordance with the embodiment of the present disclosure includes a first piston part 41, a first sealing part 42, a second piston part 43 and a second sealing part 44.

The first piston part 41 is inserted into one side of the housing part 20, and protruded from the housing part 20 by hydraulic pressure and the operating part 50 so as to push the brake shoe 110. For example, the first piston part 41 may be disposed on the left side of the body operation hole 22, and have a groove formed in the center of an end thereof such that the brake shoe 110 can be inserted into the groove. The first piston part 41 may have a screw thread formed on the inner circumferential surface thereof.

The first sealing part 42 is embedded in the housing part 20, and pressed against the first piston part 41. For example, the first sealing part 42 may be formed of an elastic material, and pressed against the outer circumferential surface of the first piston part 41 while inserted into a groove formed in the housing part 20, thereby preventing oil leakage.

The second piston part 43 is inserted into the other side of the housing part 20, and protruded from the housing part 20 by hydraulic pressure and the operating part 50 so as to push the brake shoe 110. For example, the second piston part 43 may be disposed on the right side of the body operation hole 22, and have a groove formed in the center of an end thereof such that the brake shoe 110 can be inserted into the groove. The second piston part 43 may have a space formed therein for insertion.

The second sealing part 44 is embedded in the housing part 20, and pressed against the second piston part 43. For example, the second sealing part 44 may be formed of an elastic material, and pressed against the outer circumferential surface of the second piston part 43 while inserted into the groove formed in the housing part 20, thereby preventing oil leakage.

The housing part 20 may have packings 49 mounted thereon, and the packings 49 may be pressed against the first piston part 41 and the second piston part 43, respectively, and thus prevent foreign matters from being introduced into the housing part 20.

Figure 6:
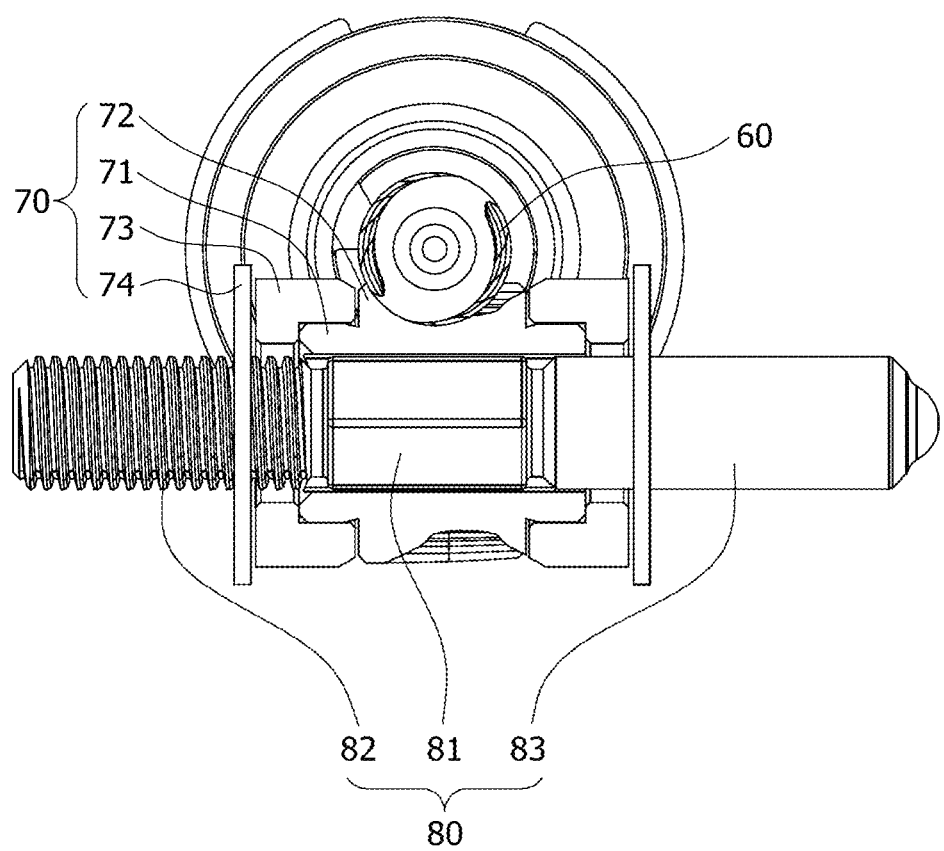
FIG. 6 is a diagram schematically illustrating an operating part in accordance with the embodiment of the present disclosure.

FIG. 6 is a diagram schematically illustrating the operating part in accordance with the embodiment of the present disclosure. Referring to FIG. 6, the operating part 50 in accordance with the embodiment of the present disclosure includes an operating gear part 60, an operating wheel part 70 and an operating rod part 80.

The operating gear part 60 is embedded in the housing part 20, and rotated by the motor part 30. For example, the operating gear part 60 may be formed as one body with the motor shaft 33, or attached to/detached from the motor shaft 33.

The operating wheel part 70 is embedded in the housing part 20, and engaged and rotated with the operating gear part 60. For example, the operating wheel part 70 may be formed in a pipe shape, and have a length in the longitudinal direction of the body operation hole 22.

The operating rod part 80 can be moved through the operating wheel part 70. As the operating wheel part 70 is rotated, the operating rod part 80 is rotated to push the piston part 40. For example, the operating rod part 80 may be rotated while interlocking with the operating wheel part 70. The operating rod part 80 is disposed between the first piston part 41 and the second piston part 43. The operating rod part 80 can push the first piston part 41 and the second piston part 43 at the same time.

The operating wheel part 70 in accordance with the embodiment of the present disclosure includes a wheel pipe part 71 and a wheel gear part 72.

The wheel pipe part 71 is formed in a pipe shape, and disposed in the longitudinal direction of the body operation hole 22. The operating rod part 80 may be moved in the longitudinal direction of the body operation hole 22 through the wheel pipe part 71.

The wheel gear part 72 can be formed on the outer circumferential surface of the wheel pipe part 71, and engaged and rotated with the operating gear part 60. For example, the wheel gear part 72 may be disposed in the center of the wheel pipe part 71.

The operating wheel part 70 may additionally include a wheel support part 73 and a wheel fixing part 74 such that the wheel pipe part 71 is restricted from moving in an axial direction. The wheel support part 73 may be formed to cover an end of the wheel pipe part 71, and the wheel fixing part 74 may be fixed to the inside of the housing part 20 and restrict the movement of the wheel support part 73. At this time, since the wheel support part 73 is formed adjacent to the wheel gear part 72, the wheel support part 73 may restrict the wheel gear part 72 and the wheel pipe part 71, formed as one body with the wheel gear part 72, from moving in the axial direction.

The operating gear part 60 and the wheel gear part 72 transfer power through a worm gear method. That is, the wheel gear part 72 may be disposed under the operating gear part 60 so as to vertically cross the operating gear part 60. When the rotation direction of the operating gear part 60 is changed, the rotation direction of the wheel gear part 72 may also be changed.

The operating rod part 80 may include a rod center part 81, a rod rotating part 82 and a rod pressing part 83.

The rod center part 81 can be moved in the axial direction through the wheel pipe part 71, and rotated while interlocking with the wheel pipe part 71. The rod rotating part 82 is extended from one side of the rod center part 81, and connected to any one of the first piston part 41 and the second piston part 43. The rod pressing part 83 is extended from the other side of the rod center part 81, and pushes the other one of the first piston part 41 and the second piston part 43.

At this time, the rod center part 81 is formed in an angled shape, and brought into surface contact with the inside of the wheel pipe part 71. The rod center part 81 and the wheel pipe part 71 may be spline-coupled to each other. The rod center part 81 may be formed in various shapes as long as the rod center part 81 can be rotated with the wheel pipe part 71 while moved through the wheel pipe part 71.

The rod rotating part 82 is screwed to any one of the first piston part 41 and the second piston part 43. For example, the rod rotating part 82 may be extended to the left side of the rod center part 81, and have a screw thread formed on the outer circumferential surface thereof so as to be screwed to the first piston part 41.

The rod pressing part 83 is inserted into the other one of the first piston part 41 and the second piston part 43. For example, the rod pressing part 83 may be extended to the right side of the rod center part 81, and inserted into the second piston part 43.

Therefore, when the rod rotating part 82 is rotated in one direction, the first piston part 41 may be moved to the left to push the brake shoe 110. At this time, since the rod rotating part 82 screwed to the first piston part 41 is moved to the right, the rod pressing part 83 may push the second piston part 43. Thus, the second piston part 43 may be moved to the right to push the brake shoe 110.

Figure 7:
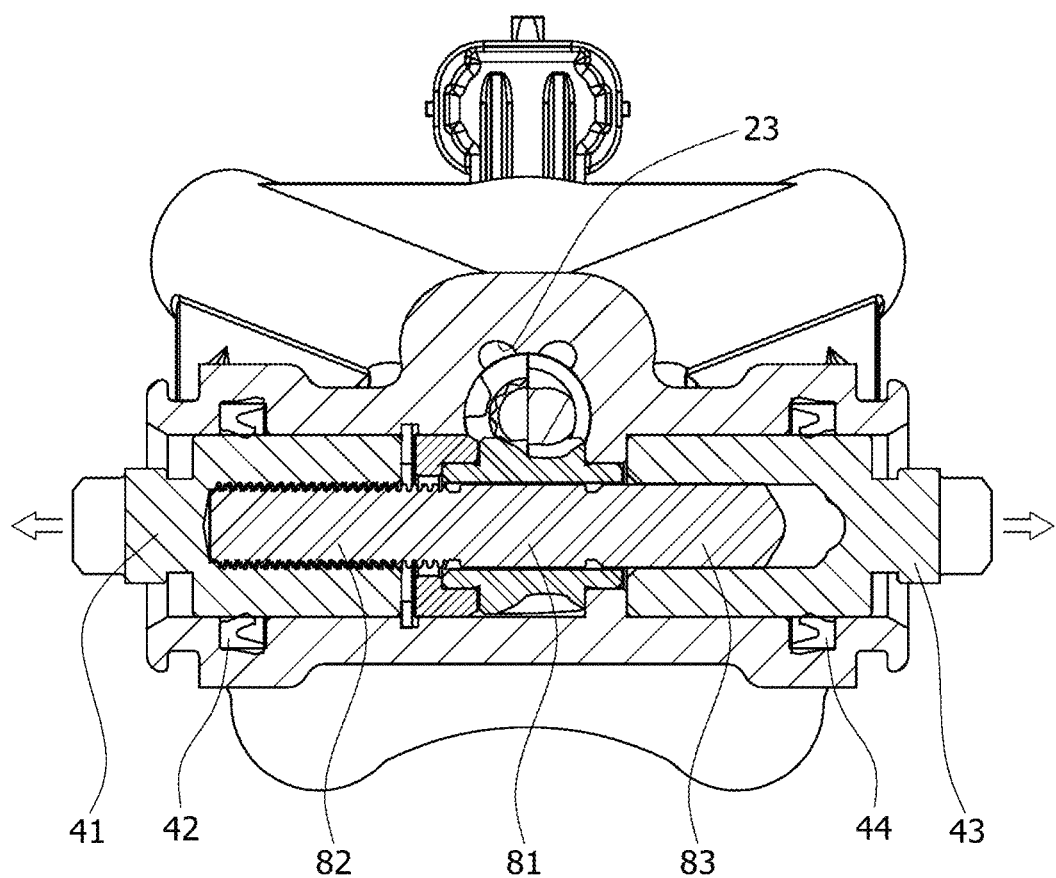
FIG. 7 is a diagram schematically illustrating a main braking state of the electronic parking brake device in accordance with the embodiment of the present disclosure.

FIG. 7 is a diagram schematically illustrating a main braking state of the electronic parking brake device in accordance with the embodiment of the present disclosure. Referring to FIG. 7, hydraulic pressure is introduced into the body operation hole 22 through the body hydraulic hole 23 during main braking. By the hydraulic pressure introduced into the body hydraulic hole 23, the first piston part 41 is moved to the left to push the brake shoe 110. By the hydraulic pressure introduced into the body hydraulic hole 23, the second piston part 43 is moved to the right to push the brake shoe 110. At this time, since the rod rotating part 82 is screwed to the inside of the first piston part 41, the rod rotating part 82 is moved to the left with the first piston part 41.

Figure 8:
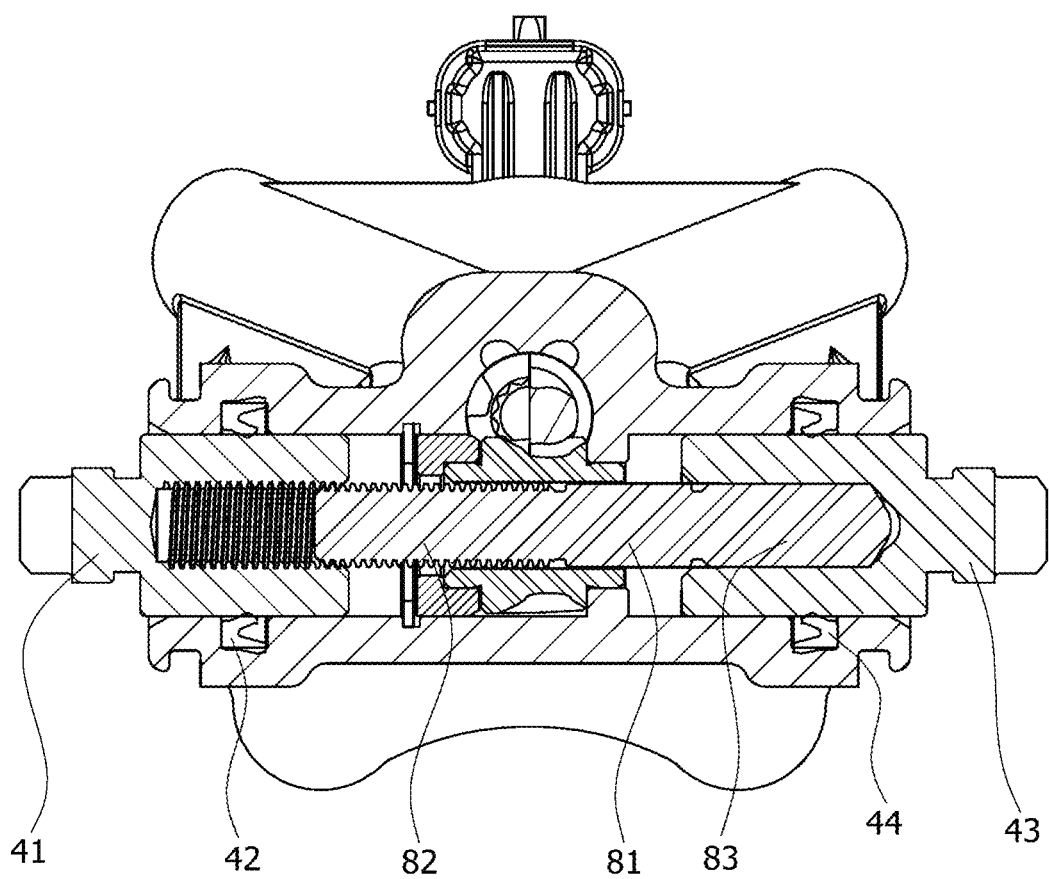
FIG. 8 is a diagram schematically illustrating a parking state of the electronic parking brake device in accordance with the embodiment of the present disclosure.

FIG. 8 is a diagram schematically illustrating a parking state of the electronic parking brake device in accordance with the embodiment of the present disclosure. Referring to FIG. 8, when power is applied to the motor part 30 during parking, the operating gear part 60 and the wheel gear part 72 engaged with the operating gear part 60 are rotated. When the wheel gear part 72 is rotated, the wheel pipe part 71 is rotated, and the rod center part 81 interlocked with the inside of the wheel pipe part 71 is rotated. When the rod center part 81 is rotated in one direction, the rod rotating part 82 screwed to the inside of the first piston part 41 is rotated to move the first piston part 41 to the left. At this time, since the rod rotating part 82 is moved to the right, the rod pressing part 83 moves the second piston part 43 to the right. Therefore, the pair of brake shoes 110 are operated at the same time to perform braking for parking.

The electronic parking brake device 1 in accordance with the embodiment of the present disclosure may perform main braking using hydraulic pressure. Furthermore, while rotated by the operation of the motor part 30, the operating part 50 may push the piston part 40 disposed on both sides of the operating part 50, thereby providing a parking braking force. At this time, since the operating part 50 and the piston part 40 are arranged in a line, the size of a product can be reduced, which makes it possible to apply the product to a small vehicle.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An electronic parking brake device comprising:
    a plate part having first and second brake shoes;
    a housing part coupled to the plate part and configured to guide a hydraulic pressure;
    a motor part coupled to the housing part;
    a piston part coupled to the housing part and configured to push the first and second brake shoes; and
    an operating part disposed at the housing part and configured to move the piston part when driven by the motor part,
    wherein the piston part comprises:
        a first piston part coupled to a first end portion of the housing part and configured to move in a first direction to push the first brake shoe; and
        a second piston part coupled to a second end portion of the housing part and configured to move in a second direction opposite to the first direction to push the second brake shoe, and
    wherein the operating part comprises an operating rod part configured to move in the second direction when rotated by the motor part in a first rotation direction, the operating rod part comprising:
        a rod rotating part disposed at a first end portion of the operating rod part, screw-coupled to the first piston part and configured to move the first position part in the first direction when the operating rod part is rotated in the first rotation direction and moved in the second direction; and
        a rod pressing part disposed at a second end portion of the operating rod part and configured to push the second piston part in the second direction when the operating rod part is rotated in the first rotation direction and moved in the second direction,
    wherein the operating part further comprises:
        an operating gear part embedded in the housing part, and rotated by the motor part; and
        an operating wheel part embedded in the housing part, and engaged and rotated with the operating gear part, wherein the operating rod part is movable through the operating wheel part and configured to push the piston part by being rotated as the operating wheel is rotated, and
    wherein the operating wheel part comprises:
        a wheel pipe part through which the operating rod part is passed;
        a wheel support part formed to cover an end of the wheel pipe part; and
        a wheel fixing part fixed to an inside of the housing part and configured to restrict a movement of the wheel support part.

2. The electronic parking brake device of claim 1, wherein the housing part comprises:
    a body having the motor part mounted therein;
    a body operation hole formed in the body, and configured to form a side-to-side moving space of the operating part; and
    a body hydraulic hole formed in the body so as to guide hydraulic pressure, and configured to communicate with the body operation hole.

3. The electronic parking brake device of claim 1, wherein the motor part comprises:
    a motor case mounted on the housing part;
    a motor driver embedded in the motor case, and driven when power is applied thereto; and
    a motor shaft rotated by the motor driver, and configured to rotate the operating part.

4. The electronic parking brake device of claim 1, wherein the piston part further comprises:
    a first sealing part embedded in the housing, and pressed against the first piston part; and
    a second sealing part embedded in the housing, and pressed against the second piston part.

5. The electronic parking brake device of claim 1, wherein the operating wheel part further comprises a wheel gear part formed on the outer circumferential surface of the wheel pipe part, and engaged and rotated with the operating gear part.

6. The electronic parking brake device of claim 5, wherein the operating gear part and the wheel gear part transfer power through a worm gear method.

7. The electronic parking brake device of claim 5, wherein:
    the operating rod part further comprises a rod center part movable through the wheel pipe part, and rotatable while interlocking with the wheel pipe part,
    the rod rotating part extends from a first side of the rod center part; and
    the rod pressing part extends from a second side of the rod center part.

8. The electronic parking brake device of claim 7, wherein the rod center part is formed in an angled shape and brought into surface contact with the wheel pipe part.

9. The electronic parking brake device of claim 7, wherein the rod center part and the wheel pipe part are spline-coupled.

* * * * *